United States Patent [19]
Kazaoka et al.

[11] 3,889,971
[45] June 17, 1975

[54] SAFETY BELT APPARATUS

[75] Inventors: Kenichi Kazaoka, Nagoya; Kimiharu Hirose, Obu; Yasuo Takeshita, Toyota; Hisao Matsumoto, Chita; Kazuo Okamoto, Nagoya, all of Japan

[73] Assignees: Toyota Jidosha Kogyo Kabushiki Kaisha, Toyota; Aisin Seiki Kabushiki Kaisha, Kariya, both of Japan

[22] Filed: Dec. 22, 1972

[21] Appl. No.: 317,699

[30] Foreign Application Priority Data
Dec. 24, 1971  Japan.................................. 47-1409

[52] U.S. Cl............................................ 280/150 SB
[51] Int. Cl............................................. B60r 21/02
[58] Field of Search................. 280/150 SB; 180/82

[56] References Cited
UNITED STATES PATENTS
3,680,883  8/1972  Keppel........................ 280/150 SB Primary Examiner—Robert R. Song
Attorney, Agent, or Firm—Waters, Schwartz & Nissen

[57] ABSTRACT

Safety belt apparatus comprising a shoulder belt, said shoulder belt being permanently anchored at one end thereof to a portion of the vehicle body on the roof side and at the other end to another portion of the vehicle body on the other side of the seat so as to be disposed diagonally across the seated passenger's chest in the protecting position; a guide track mounted closely along the roof side of the vehicle body; a pair of guide members movable along the track and connected respectively to a driving device by means of a cable to move axially along the track so as to dispose the guide members in spaced relation to each other in their unprotecting positions while in closed relation in their protecting positions whereby the belt being enabled to maintain objections at minimum to the passenger's ingress or egress.

3 Claims, 10 Drawing Figures

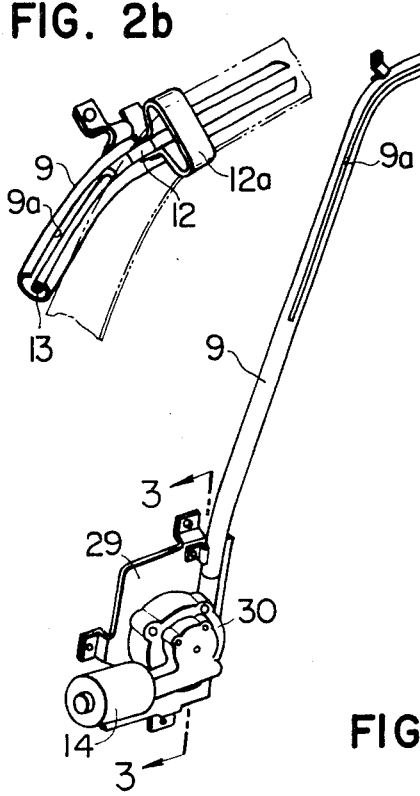
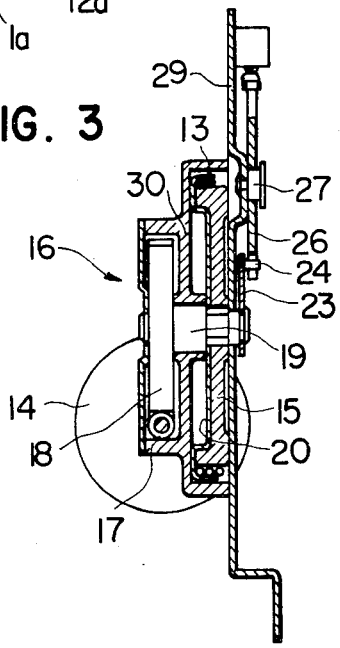
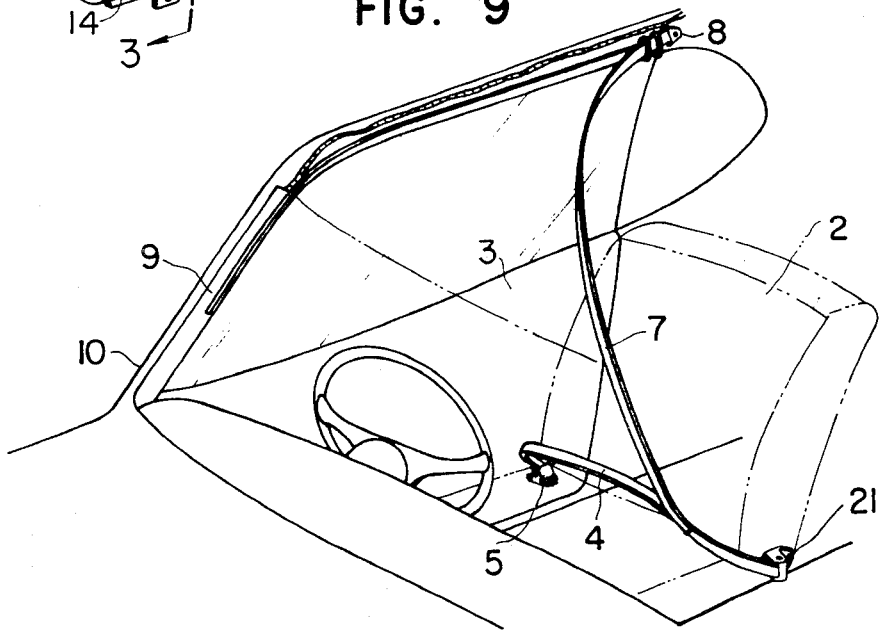

SAFETY BELT APPARATUS

BACKGROUND OF THE INVENTION

This invention relates to safety devices for vehicle, and particularly to a safety device which is passed in front of the occupants of the vehicle on either seat to prevent such occupants from being thrown forwardly out of the seat if the vehicle should become very suddenly stopped, as by collision.

As used herein, the term "shoulder belt" refers to a seat belt having one end thereof permanently anchored on one side of the vehicle seat or the floor and the other end thereof permanently secured with respect to a portion of the roof side which is disposed on the other side of the vehicle seat wherein an intermediate portion of the seat belt is continuously disposed diagonally across the seated passenger's chest when the belt is in its protecting position.

As used herein, the term "waist belt" refers to a seat belt having one end thereof permanently anchored to a portion of the vehicle on one side of the seat or the floor and the other end thereof permanently secured with respect to a portion of the vehicle door which is disposed on the other side of the vehicle seat wherein an intermediate portion of the seat belt is continuously disposed across a portion of the vehicle seat in any opened or closed position of the vehicle door.

While various means have been previously employed for a safety belt apparatus having a shoulder belt and automatically securing a person to a vehicle seat upon his occupying same and turning on the vehicle's ignition, none have proven to be entirely sufficient, particularly in disposing the safety belt closely exactly along the roof side of the vehicle body when the door is opened for readiness of egress of the person.

SUMMARY OF THE INVENTION

A principal object of the invention is to provide an improved safety belt apparatus which automatically secures a person to a vehicle seat.

Another object of this invention is to provide a safety belt apparatus which exactly closely disposes the major part of the shoulder belt along the roof side of the vehicle body so that the passenger may get out of the vehicle without any difficulty.

The foregoing object and others are attained according to at least one aspect of the present invention through the provision of a plurality of sliding guide members which slide along a guide track to dispose the belt in rest position for enabling the passenger to get off the vehicle as he would in the absence of any safety device.

Thus, in the disclosed embodiments, there are comprised a waist belt permanently anchored at one end thereof to the vehicle door and at the other end to a portion of the vehicle opposed to said door on the seat or the floor, at least one of said ends being provided with a retracting means through which said waist belt is secured to said door or said portion so that said waist belt may vary its length by said retracting means as the door is closed or opened, a shoulder belt permanently anchored at its one end to a roof side portion of the vehicle body immediately over the seated passenger's shoulder and at the other end secured through a retracting means to a portion of the vehicle opposed to said door on the seat side or the floor, a guide track extending closely along curvature of the roof side from a portion thereof near said end of said shoulder belt over passenger's shoulder toward the lowermost end of the front pillar of the vehicle, sliding guide means to slide freely within said track and to engage said shoulder belt in freely slidable relation therewith, driving means, a cable connecting said driving means to said sliding guide means, and control means to control said driving means in response to ingress or egress motion of the passenger whereby said shoulder belt and thence said waist belt are displaced to the protecting or unprotecting position making it unnecessary for the occupant of the vehicle to consciously strap to or release from the vehicle seat his body.

BRIEF DESCRIPTION OF THE DRAWING

Additional objects and the novel features of this invention will become apparent from the description which follows, taken in conjunction with the accompanying drawings, in which:

FIG. 2a is a perspective view of the guide track usable in the device according to this invention in FIG. 1;

FIG. 2b is an enlarged scale perspective view of the guide track partially cut off;

FIG. 3 is an enlarged scale sectional view taken substantially on the line 3 — 3 of FIG. 2a and in the direction of the arrow;

FIG. 9 is a perspective view of another embodiment of seat belt device constructed in accordance with the subject invention, the vehicle door being shown in closed position.

DESCRIPTION OF THE PREFERRED EMBODIMENTS

Figure 1:
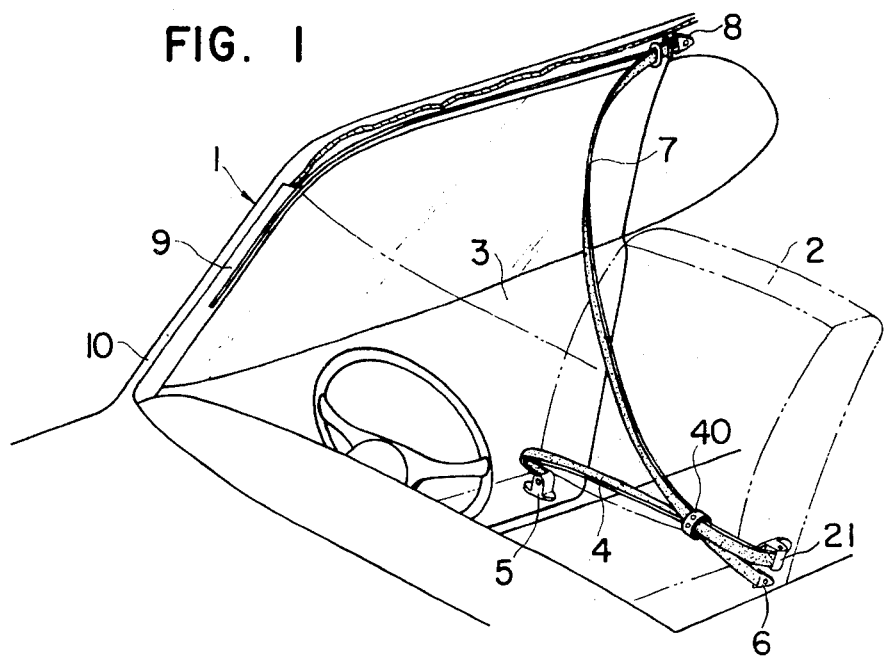
FIG. 1 is a fragmentary perspective sectional view of a part of a vehicle with the invention principles applied thereto.

Referring now to the drawings, in FIG. 1 is fragmentarily shown vehicle 1 with perspective view which will indicate that the prime but not exclusive field of utility for the invention is the automobile. In the view, is shown a portion of a vehicle seat 2 and a vehicle door 3 in a closed position and to which is mounted a belt retracting means 5 of known construction. The retracting means comprises a drum not shown and releasably securing means. The drum is biased normally to rotate to wind thereupon the excess portion of the belt until the belt is snugly drawn about the passenger's body while permitting the belt to be unwound by pulling the belt against the spring. The releasably securing means is gripping engagement with the seat belt when the ignition is switched on and out of the engagement when the ignition is switched off whereby the passenger is strapped to the seat during the vehicle travel to prevent from being thrown out of the seat if the vehicle should become very suddenly stopped.

What has been described above is a retracting means of conventional structure, as commonly used in automotive vehicles and illustration therefore will not be necessary. For the purpose of explanation in detail of the operation of an apparatus to one embodiment of the invention, the accompanying drawings show appearance of the retracting means 5 only and not its specific structure, it being understood that the retracting means may itself be conventional.

The waist belt 4 is anchored at its one end to the retracting means 5 and at the other end to a portion of the vehicle on the side of seat 2 opposed to the door or the floor by means of conventional anchoring means 6. Shoulder belt 7 is permanently anchored to a portion of the vehicle on the seat side or the floor through the retracting means 21 and at the other end to a portion of the vehicle of the vehicle on the roof side immediately over the seated passenger's shoulder by means of the known anchoring means 8. The track or guide 9 extends axially along the roof side of the vehicle body between a portion on the roof side immediately over the passenger's shoulder and the lowermost end of the front pillar as best shown in FIG. 2. The track is of tubular form and is axially slitted throughout its almost full length. Two sliding guide members 11 and 12 are captive in the tubular track and free to slide therein. Rings 11a and 12a are respectively extending from the sliding guide members 11 and 12 as best shown in FIG. 2b. The foot portion of each rings 11a and 12a is passed slidably through the slit 9a of the track 9 so that rings are both on the exterior of the track 9. A cable axially extends as at 13 through the track 9 and is free to slide within the tubular track 9. The guide member 11 is fast on the cable 13 whereas the other guide member 12 is free to slide on the cable 13. The extremity end of the cable 13 is so enlarged that it provides stopper means 22 to prevent the member 12 from being fallen out of the cable when the cable is drawn toward the front pillar 10 as hereinafter described. It should be noted that although the cable is flexible, the stiffness thereof is so calculated in design that the cable may reciprocate within the track without flexure, while the diameter of the tubular track 9 being of suitable size to allow this reciprocation but prohibit the flexure. As shown in FIG. 3, motor 14 is mounted on the vehicle about the lowermost end of the front pillar 10 and through a reduction gearing assembly actuates a winding drum 15 on which there is the cable 13. This winding drum 15 is drivingly connected with the reduction gearing assembly. The motor and the reduction gearing assembly form a winding unit or driving means 16 to which is connected the track 9 so that the cable 13 may be reciprocated axially along the track as the motor drives the winding drum 15. Worm 17 and worm wheel 18 form the reduction gearing assembly the driven shaft 19 of which carries thereon the said winding drum 15 to wind the cable 13. A cover 20 provides means to prevent the cable 13 from tending to get out of the surface of the drum 15 upon its resiliency so that the cable is snugly wound upon the drum.

Figure 4:
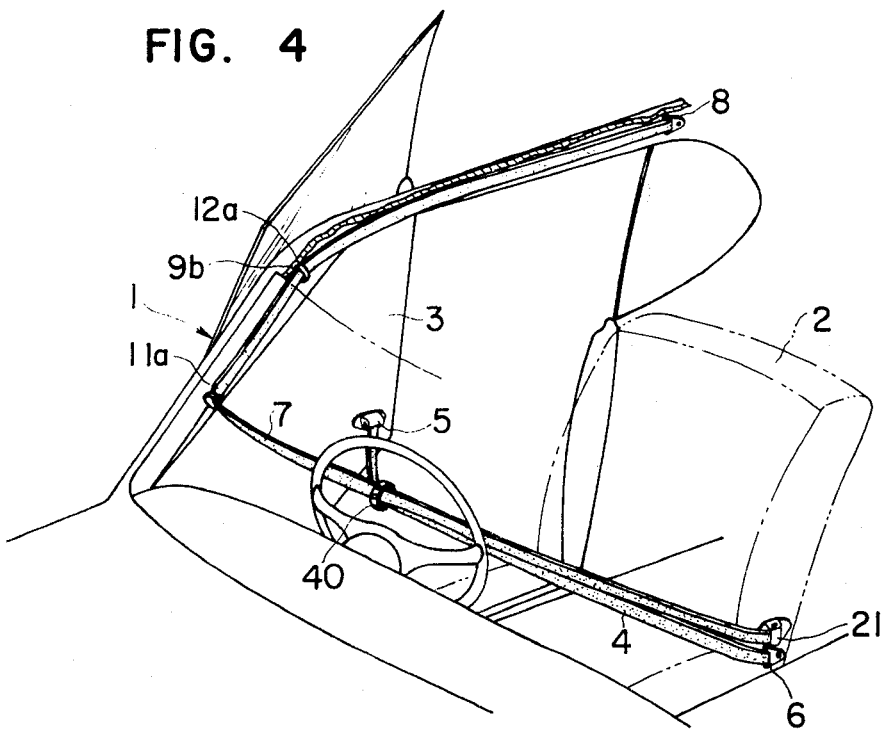
FIG. 4 is a view similar to that of FIG. 1 showing the door of the vehicle in opened position.

As the door 3 is swung open, the cable is wound upon the drum as hereinbelow will be described so that the sliding guide member 11 is first moved toward the front terminal of the slit 9a. The second sliding guide member 12 is left for a little while until the stopper means 22 abuts to the guide member 12. After the abutment of the stopper means 22, the member 12 advances together with the stopper 22 toward the front pillar 10, namely the member 11 ahead advancing and the second member 12 following at a presetable distance from the first member 11. This relationship between the both guide members is best shown in FIG. 4. Reverse takes place when the cable is unwound from the drum. This is effective to position the belt 7 very closely along the roof side curvature of the vehicle body to thereby present no objection to the passenger to get out of the seat 2. When the first member 11 reaches the front unprotecting position, the belt 7 is so displaced that the upper major portion thereof lies along the roof side while remainder of the belt diagonally lies across the space in front of the seat 2. The passenger may accordingly get off the vehicle as he would in the absence of such belt.

Figure 5:
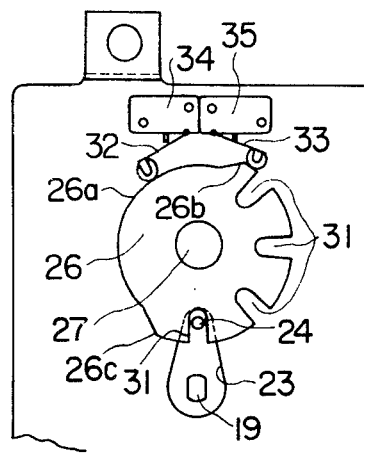
FIGS. 5 and 6 are diagrammatical views of control means of the present invention to drive the drum in response to ingress or egress of the passenger.
Figure 7:
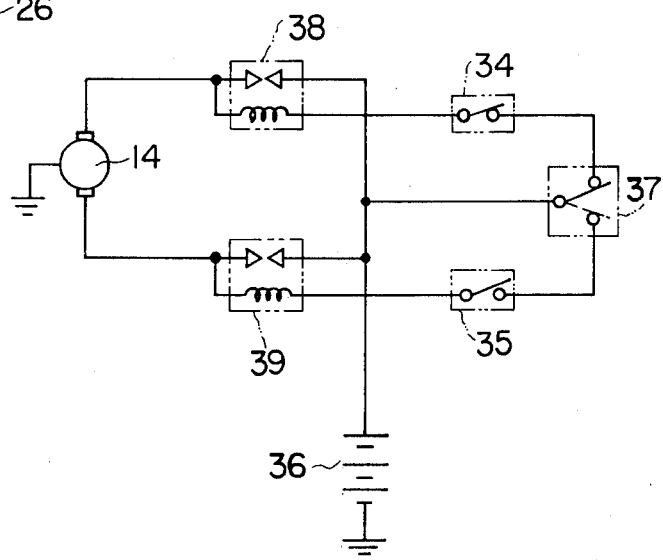
FIG. 7 is a schematic diagram indicating wiring for motors which actuates the winding drum in dependency upon the ingress or egress motion of the passenger.

The motor 14 operates so as to have the drum 15 wind up thereupon or unwind therefrom the cable 13. Means to actuate the motor 14 is described hereinafter. As shown in FIG. 3, shaft 19 of the worm wheel 18 has thereon secured an arm 23 on which is fast a stud 24 as shown in FIG. 5. A cam or gear 26 is rotatably supported on a stud 27 fast on a base plate 29 of the vehicle body which is integral with a cover 30 of the reduction gearing assembly 16. As best shown in FIG. 5, the stud 24 engages radial slots 31 in the gear 26 while passing through the inner half of its circle of travel. The driven gear 26 is locked against rotation when the driving tooth or stud 24 is not in mesh by two resiliently engaging arms 32 and 33 extending downwardly from the switches 34 and 35 respectively. The arms 32 and 33 have rollers 32a and 33a at their extremity ends respectively for smooth engagement with a series of cam faces 26a, 26b and 26c formed on the periphery of the gear 26. The cam faces 26b and 26c have identical rise. Between the cam faces 26b and 26c is provided said series of radial slots 31. The cam face 26a is the falling side and the cam faces 26b and 26c are both the same rising sides of the cam 26. The driven cam 26 rotates through a fractional part of a revolution once each revolution of the driver arm 23, higher ratio reduction gearing thus resulting. The motor 14 for sliding guide members 11 and 12 in the guide track 9 is connected with a suitable source of electrical energy 36, as shown in FIG. 7. Switches are provided to automatically control the actuation of the motor 14, there being one switch 37 in the path of travel of the door 3 at the door sill not shown. Such position is not exclusive field of utility for the switch and the switch may be operatively connected to the ignition switch. The limit switches 34 and 35 are both mounted in the path of the cam faces of the cam 26 as will be seen in FIG. 5. The switch 37 is arranged such that when the vehicle door 3 is opened and the sliding members 11 and 12 are in latched position (FIG. 1), the switch 37 is closed as shown in the view in heavy line. When the door is closed, switch 37 is in the dotted line position as shown in FIG. 7. The switch 37, limit switches 34 and 35, electrical relays 38 and 39, motor 14 and electrical energy source 36 form wiring for motors causing motor 14 to be actuated.

Figure 6:
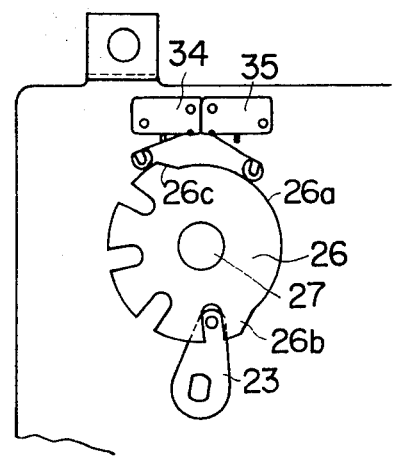

The operation of the invention is as follows: When the door is, say door 3, is opened, the passenger is allowed to get out of the vehicle without having to even touch the safety belt. It should be noted that the gear 26 is in the position shown in FIG. 4 immediately before opening the door and the limit switch 34 therefore is closed whereas the other switch 35 is open as shown in FIG. 7. Since the switch 37 has moved in the heavy line position in FIG. 7 it should be noted that the relay 38 becomes operative and thence motor 14 is caused to be actuated. The cable 13 is wound upon the winding drum 15 as previously described. The sliding guide member 11 and the stopper 22 together travel in spaced relation relative to each other as the motor 14 operates. Although the other sliding member 12 is left until it abuts the stopper member 22, it follow thereafter the sliding member 11 with the distance defined by the stopper 22 and the preceding guide member 11. The safety belt or shoulder belt 7, freely slidable through the two rings 11a and 12 a, is accordingly forced to shift toward the front pillar 10 to its unlatched position with its upper major portion closely along the roof side of the vehicle body, and the other portion diagonally across the space in front of the seat 2. At the time the belt is positioned as above, the other waist belt 4 is also shifted diagonally across the space. The occupant of the vehicle can ingress or egress from the vehicle without having to even touch the both belts. During the above operation, the both belts are together allowed to be drawn from the corresponding retracting members 5 and 21 as they are displaced and thereby tensioned. Further, it will be noted that when the gear 26 is rotated through an angle in clockwise direction from the position shown in FIG. 5, the limit switch 35 is also closed as will be seen in FIG. 7. The motor continues to operate until sufficient cable length is wound around drum 15 and until the other cam face 26c opens switch 34. Then the motor 14 is stopped. This leaves switch 34 opened and switch 37 is in the dotted line position as shown in FIG. 7. The individual parts of the device are brought into the positions shown in FIG. 6. When a person becomes seated in the vehicle, he closes the door 3 as he normally would in the absence of any safety device. The switch 37 is in the position indicated in dotted line in FIG. 7 and while the switch 35 has closed and the other switch 34 has been opened. The motor therefore rotates in adverse direction so that the cable 13 is returned through the track until the switch arm 33 engages the cam face 26b as shown in FIG. 5 again. In case where either ingress or egress of the passenger is suspended and the safety belts are both to be returned, reverse will take place upon returning the door to its precedingly occupied position.

Figure 8:
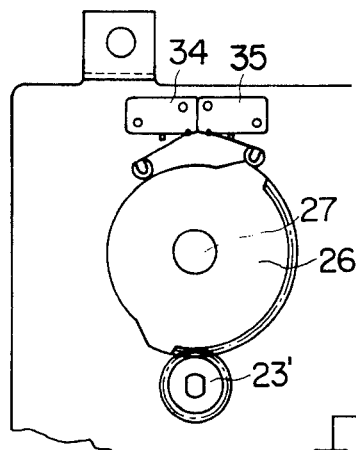
FIG. 8 is a view similar to that of FIG. 5.

In the embodiment of FIG. 8, there is provided a segmental gear 26' and a pinion gear 23' substituted for the gear 26 and arm 23 respectively. The same operation may be performed by the modification as that of the embodiment of FIG. 5.

In FIG. 9, there is shown another embodiment according to the present invention in which the waist belt and the shoulder belt are together connected in bifurcated form whereas the embodiment in FIG. 1 has the said two belts combined at their middle portions by a ring 40 as shown in FIGS. 1 and 2. The embodiment in FIG. 9 has no anchoring means such as member 6 in FIG. 1, accordingly. The same result in operation will be obtained by the two embodiments.

What is claimed is:

1. A seat belt device for a vehicle having at least one door, a front pillar, as well as floor and roof portions, for securing a passenger to a seat in the vehicle, the device comprising: a waist belt anchored at one end to said door, and at the other end to a portion of the vehicle opposed to said door on one of said seat and said floor portion; a shoulder belt operatively connected with said waist belt, and being anchored at one end to a side of said roof portion above said door, and at the other end to one of said seat and said floor portion; retracting means secured to at least one of said belts to vary the length thereof, to thereby selectively restrain and release the passenger to and from said seat; a guide track supported at a portion of said side of the roof portion and extending along a curvature of said side up to the lowermost end of said front pillar; guide means slidably mounted on said track and engageable with said shoulder belt for guiding the movement of the latter; and driving means operatively connected to said guide means and being actuatable for sliding the same in response to ingress and egress motions of the passenger into and out of the vehicle; wherein said guide means includes a cable in said track for connecting said driving means with said guide means; and wherein the latter includes a pair of first and second guide members, said first guide member being proximate to said front pillar and being fastened to said cable, and said second guide member being freely slidable on said cable so that forward movement of the latter causes said second guide member to follow said first guide member in spaced relation therewith.

2. The seat belt device as defined in claim 1, further comprising means for controlling the actuation of said driving means in response to the respective ingress and egress motions of the passenger.

3. The seat belt device as defined in claim 1, wherein said cable includes stopper means fastened to said cable at its end opposed to said driving means, said stopper means being spaced from said first guide member such that when the latter is at the front terminal end of said track, said second guide member is positioned at a portion of said track immediately prior to the uppermost end of said front pillar.

* * * * *